United States Patent

[11] 3,551,711

| [72] | Inventor | Dhu Aine J. Davis |
| | | Wheaton, Ill. |
| [21] | Appl. No. | 792,722 |
| [22] | Filed | Jan. 21, 1969 |
| [45] | Patented | Dec. 29, 1970 |
| [73] | Assignee | Hermetic Coil Co., Inc. |
| | | a corporation of Connecticut |

[54] ENCAPSULATED ELECTRIC MOTOR HAVING PM ROTOR AND CLAW TOOTHSTATION
6 Claims, 5 Drawing Figs.

[52] U.S. Cl............................................................. 310/43,
310/156, 310/162
[51] Int. Cl........................................................... H02k 1/04,
H02k 21/12
[50] Field of Search........................................... 310/42, 43,
49(A), 51, 156, 162—5, 257

[56] References Cited
UNITED STATES PATENTS

| 2,794,137 | 5/1957 | Faus et al...................... | 310/164 |
| 2,798,995 | 7/1957 | Mc Lean ...................... | 310/43X |
| 3,231,770 | 1/1966 | Hyde............................. | 310/156 |
| 3,254,245 | 5/1966 | Staar............................ | 310/49 |
| 3,302,046 | 1/1967 | Brandwijk .................... | 310/49 |

Primary Examiner—W. E. Ray
Attorney—Hofgren, Wegner, Allen, Stellman and Mc Cord ABSTRACT: An encapsulated electric motor with a toroidal coil, a claw tooth stator and a permanent magnet rotor. The coil is positioned within a recess formed by the pole plate and pole pieces of the field poles of the stator with the first pole plate adjacent to one end of the core and the pole plate of the second field pole adjacent the other end of the core. The pole pieces of both poles extend in the same direction beyond one end of the core forming a recess within which a permanent magnet rotor is positioned. A unitary encapsulating casing of insulating material is molded about the motor to provide a hermetic seal, to hold the pole pieces against the coil, and to position and support the coil and pole pieces concentric with the longitudinal axis.

PATENTED DEC 29 1970
3,551,711
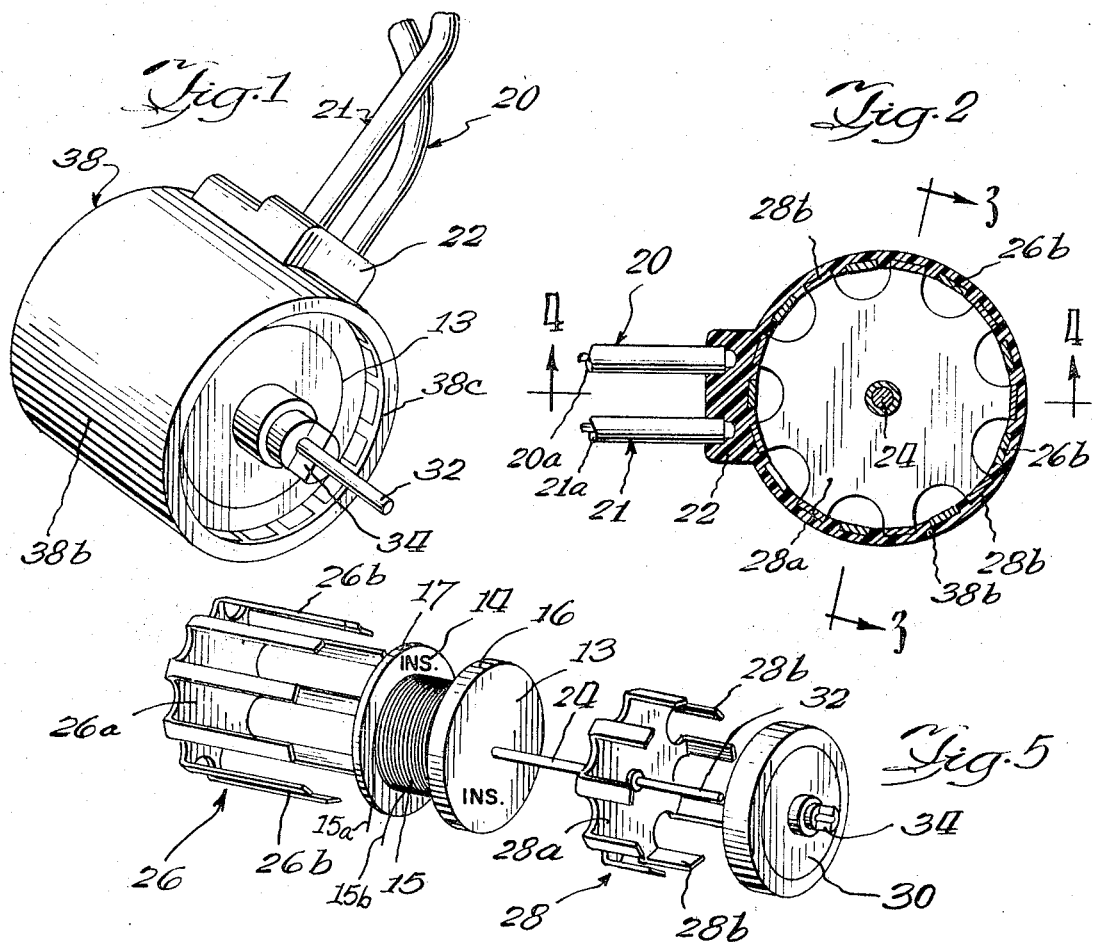
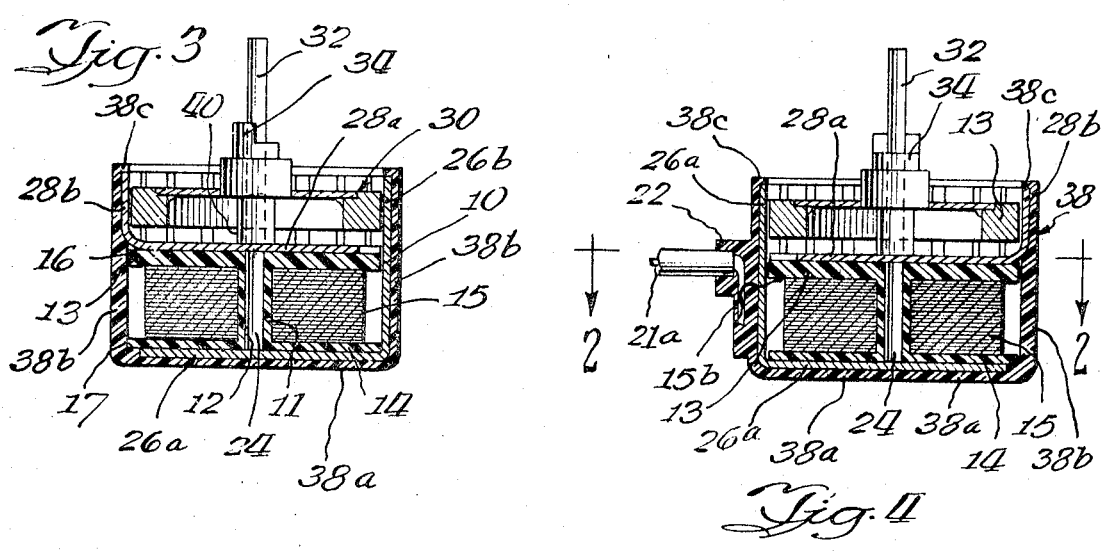
INVENTOR
Dhu Aine J. Davis
BY Hofgren, Wegner, Allen, Stellman & McCord
ATTORNEYS 3,551,711

ENCAPSULATED ELECTRIC MOTOR HAVING P-M ROTOR AND CLAW TOOTH STATION

BACKGROUND AND SUMMARY OF THE INVENTION

This invention relates to electric motors, and more particularly to synchronous motors.

Conventional motors using permanently magnetized rotors have magnets with alternate poles around a given diameter and an electromagnetic field with instantaneous alternate poles on a slightly larger diameter around the permanent magnet rotor. In many cases motors are required which will operate reliably for long periods of time in a sealed or inaccessible unit where maintenance is impossible. Especially under such circumstances, simplicity of construction would tend to increase reliability, because additional motor parts are most often additional potential sources of failure. In some cases, motors are required for use in devices which are intended to be discarded and replaced, after a period of time, rather than repaired. The synchronous motor of this invention has a unitary encapsulating casing which not only seals the motor, but the casing holds the motor parts together, interlocks and spaces the pole pieces and totally eliminates housing and mounting parts. In addition, in some applications, it is desirable to reduce the total weight and size of the motor, as well as reduce the number of parts. The encapsulating casing is molded of plastic material to provide a compact and lightweight structure.

An object of the invention is to provide an improved sealed or encapsulated synchronous motor.

Another object of the invention is to provide an encapsulated electric motor which comprises a flat coil having a core and electric winding means to generate a fluctuating magnetic flux, a field pole overlying the coil at one end of the core with a series of magnetic pole pieces arranged in circumferentially spaced relation about a longitudinal axis. A rotor of permanent magnetic material is mounted for rotation about the longitudinal axis and has a series of radially displaced premagnetized pole portions extending in a circumferentially spaced relationship adjacent the series of pole pieces of the field pole whereby the rotor is rotated when the coil is energized to generate the fluctuating magnetic flux. A unitary encapsulating casing of insulating material is molded about the motor to provide a hermetic seal about the motor and to position and support the coil, core and pole pieces concentric with the longitudinal axis.

A further object of the invention is to provide an encapsulated electric motor as set forth in the preceding paragraph which includes first and second field poles overlying the coil at opposite ends of the core with each of the field poles having a series of magnetic pole piece circumferentially spaced about the longitudinal axis adjacent the series of circumferentially spaced premagnetized poles of the rotor. The first field pole has a pole plate overlying the coil at one end of the core and includes pole pieces extending generally perpendicular to the pole plate circumferentially about the longitudinal axis, on the outside of the coil, the pole pieces extending beyond the other end of the coil at least the thickness of the rotor. The second field pole similarly has a pole plate overlying the coil but at the other end of the core with pole pieces extending generally perpendicular to the pole plate away from the other end of the coil a distance at least the thickness of the rotor circumferentially about the longitudinal axis and equidistant radially from the axis as the pole pieces of the first pole to define a cup-shaped recess within which the rotor is positioned with its premagnetized poles adjacent the pole pieces of the field poles. The encapsulating casing holds the pole plates of the field poles against the ends of the coil and maintains the pole pieces circumferentially about the longitudinal axis.

Still another object of the invention is to provide an encapsulated motor as set forth in the preceding paragraph, with the encapsulating casing being cup-shaped and having a base portion overlying the outside of the pole plate of the first field pole, sidewall portions covering the outside of the pole pieces of both the first and second field poles, and a lip portion extending inwardly over the ends of the pole pieces to hold the field poles against the ends of the coil. The encapsulating casing has portions extending inwardly between the pole pieces to maintain the pole pieces in a spaced relationship.

Other objects and advantages of the invention will become apparent from the following detailed description taken in connection with the accompanying drawings.

DESCRIPTION OF THE DRAWINGS

FIG. 1 is a perspective view of an encapsulated electric motor embodying the invention;

FIG. 2 is a section taken generally along the line 2-2 of FIG. 4;

FIG. 3 is a section taken generally along the line 3-3 of FIG. 2;

FIG. 4 is a section taken generally along the line 4-4 of FIG. 2; and

FIG. 5 is an exploded perspective view of the electric motor with the encapsulating casing removed to illustrate the interior components of the motor.

DETAILED DESCRIPTION OF THE INVENTION

Turning now to the drawings, an illustrated embodiment of an encapsulated synchronous motor incorporating the invention is shown. A flat, bobbinlike coil form, generally designated 10, includes a coil receiving central portion or hub 11 having a bore 12 therethrough. A pair of disc-shaped end portions 13 and 14 extend outwardly from the central portion 11 at opposite ends thereof. The coil winding means itself comprises a plurality of turns 15 of a suitable wire wound about the coil receiving central portion 11 and between the flangelike disc portions 13 and 14, with the outer layer of the windings being spaced inside the edges 16 and 17 of the discs. The coil form preferably is of a molded plastic material, as nylon.

A pair of terminal leads 20 and 21, each having a suitable insulating covering 20a and 21a, are connected with wires 15a and 15b at the ends of the winding means 15. The terminal leads 20 and 21 are positioned and retained by a boss portion 22 of an encapsulating casing, to be described in greater detail hereinafter. A core 24 is positioned in the bore 12 through the central portion 11 of the coil form 10. As set forth below, the core 24 and winding means 15 will generate a fluctuating magnetic flux when an AC voltage energizes the winding means.

A first cup-shaped field pole, generally designated 26 (FIG. 5), has a pole plate 26a which overlies the coil at one end of the core 24 and has a plurality of pole pieces 26b extending generally perpendicular to the pole plate 26a on the outside of the coil form 10 circumferentially about a longitudinal axis which extends longitudinally through the center of the core 24. The pole pieces 26a define a series of magnetic pole pieces in spaced relationship about the longitudinal axis and the pole pieces extend beyond the end disc 13 of the coil form to define a cup-shaped recess.

A second cup-shaped field piece, generally designated 28 (FIG. 5), is somewhat similar to the field pole 26 in that it has a pole plate 28a overlying the coil, but at the other end of the core 24, with pole pieces 28b defining magnetic pole pieces arranged in circumferentially spaced relation about the longitudinal axis generally perpendicular to the pole plate 28a. The pole pieces 28b are spaced equidistant radially from the axis as the pole pieces 26b of the first field pole 26 to define a cup-shaped recess within which a rotor, generally designated 30, is positioned. The rotor 30 is of permanent magnetic material and is mounted for rotation about the longitudinal axis extending through the core 24. The rotor has a series of radially premagnetized pole portions extending in a circumferentially spaced relationship adjacent the series of pole pieces defined by the pieces 26b and 28b of the field poles 26 and 28, respectively. A shaft 32 is fixed to the rotor 30 with suitable connecting means 34 thereabout concentric with the longitudinal axis through the core 24. The shaft 32 and connecting means 34 drive suitable operating mechanism to which the motor is connected.

When an AC voltage energizes winding means 15, an instantaneous magnetic flux field will form which will energize all the free ends of the pole pieces 26b of the field pole 26 with an identical magnetic polarity. Similarly, the resulting magnetic flux field will magnetize all the free ends of the pole pieces 28b of the field pole 28 with an identical magnetic polarity, opposite that of the pole pieces 26b. Thus, pole pieces 26b will assume either a north or south magnetic polarity, depending upon the direction of the applied magnetic field, which in turn depends upon the instantaneous direction of the applied AC voltage, and the pole pieces 28b will assume an opposite polarity. The rotor 30 is composed of a material that has been permanently magnetized in localized regions about its periphery to form adjacent areas of opposite magnetic polarity. These areas form magnetic north and magnetic south poles. Thus, as is known in the art, when an AC voltage energizes winding means 15, the polarity of the pole pieces 26b and 28b will fluctuate and the rotor will rotate.

An encapsulating casing, generally designated 38, is preferably formed, as by an injection molding operation, of a suitable insulating material. For example, the covering may be of the same nylon material as the coil form 10. The encapsulating casing is cup-shaped with a base portion 38a overlying the pole plate 26a of the field pole 26. Sidewall portions 38b cover the outside of the pole pieces 26b and 28b of the field poles 26 and 28 and a lip portion 38c extends inwardly over the free ends of the pole pieces 26b, 28b. In this manner, not only does the sidewall portion 38b of the encapsulating casing maintain the field poles 26, 28 and the coil form 10 concentric about a longitudinal axis through the core 24, but the lip portion 38c of the encapsulating casing holds the field poles firmly against opposite ends of the coil form. The encapsulating casing, on injection, also extends inwardly between the alternate pole pieces 26b and 28b of the field pieces 26 and 28, respectively, to maintain the pole pieces in a proper spaced relationship. In essence, the unitary injection molded casing interlocks the various components of the motor, positions the components and maintains them concentric with the longitudinal axis, properly spaces the components, and provides a physical bond therebetween to eliminate housing and mounting parts which are often potential sources of failure. The encapsulating casing also eliminates the necessity of staking the field poles 26 and 28 and the coil form 10. The rotor simply is positioned by an annular boss 40, fixed to the pole plate 28a of the field pole 28, for receiving the inner end of the shaft 32 fixed to the rotor 30.

Prior to encapsulation the terminal leads 20 and 21 are attached to the winding end wires 15a and 15b. Encapsulating material is introduced into an appropriate mold cavity through an appropriate passage which enters the mold cavity at a point substantially on a diameter of the coil passing through the point of juncture between the coil and the terminal leads so that the material is allowed to flow evenly about each side of the coil without obstruction of one path more than the other by the terminal leads. The winding end wires 15a, 15b extend outwardly between adjacent pole pieces 26b, 28b and the encapsulating material holds the end wires in position in connection with the terminal leads 20 and 21.

Preferably, the inner ends of the pole pieces 26a, 28b of the field poles 26 and 28, respectively, are exposed by the encapsulating material as shown best in FIG. 1. Referring to FIG. 2, it can be seen that the encapsulating material extends inwardly between the adjacent pole pieces just to the inner faces thereof.

The foregoing detailed description has been given for clearness of understanding only and no unnecessary limitations should be understood therefrom as some modifications will be obvious to those skilled in the art.

I claim:

1. An encapsulated electric motor comprising a flat coil having a core and electric winding means to generate a fluctuating magnetic flux, first and second field poles overlying said coil at opposite ends of said core, each with a series of magnetic pole pieces arranged in circumferentially spaced relation about a longitudinal axis, a disc-shaped rotor of permanent magnetic material mounted for rotation about said axis and having a series of radially premagnetized poles extending in circumferentially spaced relationship adjacent said first and second series of pole pieces of said field poles whereby said rotor is rotated when the coil is energized to generate said fluctuating magnetic flux, and a unitary encapsulating casing of insulating material molded about said motor, providing a hermetic seal about the motor, positioning and supporting said coil, core and field poles concentric with said axis.

2. The electric motor of claim 1 wherein said encapsulating casing positions and supports said first and second field poles concentric with said axis and has means for holding said first and second pole plates against opposite ends of said core.

3. The electric motor of claim 2 wherein said first field pole has a pole plate overlying said coil at one end of said core with pole pieces extending generally perpendicular to said pole plate circumferentially about said axis on the outside of said coil, said pole pieces extending beyond the other end of the coil at least the thickness of said rotor, said second field pole having a pole plate overlying said coil at the other end of said core with pole pieces extending generally perpendicular to said pole plate away from said other end of the coil at least the thickness of said rotor circumferentially about said axis and equidistant radially from said axis as the pole pieces of said first field pole to define a cup-shaped recess within which said rotor is positioned with its premagnetized poles adjacent the pole pieces, said encapsulating casing holding the pole plates of said field poles against the ends of said coil and maintaining said pole pieces circumferentially about said axis.

4. The electric motor of claim 3 wherein said encapsulating casing is cup-shaped with a base portion overlying the pole plate of said first field pole, sidewall portions covering the outside of the pole pieces of said first and second field poles, and said holding means comprises a lip portion extending inwardly over the ends of said pole pieces to hold said field poles against the ends of said coil.

5. The electric motor of claim 4 wherein the pole pieces of said first field pole and the pole pieces of said second field pole are alternately spaced circumferentially about said axis, said encapsulated casing having portions extending inwardly between said pole pieces to maintain said spacing.

6. The electric motor of claim 4 wherein end wires from said coil extend outwardly between adjacent pole pieces of said poles, said encapsulating casing holding said end wires for connection to appropriate terminal leads.